Patented Apr. 6, 1954

2,674,591

UNITED STATES PATENT OFFICE 2,674,591

KETONE-ALDEHYDE RESINS CONTAINING SULFONIC ACID GROUPS

Theodore White and Jeremy Ralph Barnes Hastings, London, England, assignors to The Forestal Land, Timber and Railways Company Limited, London, England, a British company No Drawing. Application October 10, 1950, Serial No. 189,482

Claims priority, application Great Britain October 14, 1949

17 Claims. (Cl. 260—64)

This invention relates to water-soluble resinous condensation products and to the application thereof to the tanning of hides in the manufacture of leather.

It is known that aldehydes and ketones form condensation products which if condensed to a sufficiently high degree are water-insoluble resins.

It has now been found according to this invention that by the introduction of sulphonic acid groups into such resins they can be rendered water-insoluble and that these products have a marked capacity for precipitating gelatin from solution at acid pH values. They have also been found to possess a relatively high tannin content as measured by the official method of hide powder analysis, and to be capable of producing a range of types of leather when used in the same manner as the vegetable tans.

The mechanism of this tanning action is not yet clear. It is doubtful if it is due to the sulphonic acid groups only although they undoubtedly contribute to the reaction with hide.

Thus, the novel resins of the present invention are resinous condensation products of at least one aldehyde of the formula RCHO, wherein R is selected from the group consisting of hydrogen and saturated and unsaturated aliphatic hydrocarbon groups containing from one to three carbon atoms and at least one ketone of the formula R'R''CO, wherein each of the substituents R' and R'' is an alkyl group wherein R' plus R'' is not more than four carbon atoms containing one or more sulphonic acid groups, said products being water-soluble.

Preferably, the condensation products are those of acetone and formaldehyde, or methyl ethyl ketone and formaldehyde, into which have been introduced one or more sulphonic acid groups. A range of related products based on the condensation of other aldehydes and other ketones may be used. Among these other aldehydes and ketones are acetaldehyde, crotonaldehyde and methyl propyl ketone.

Other of these resinous condensation products containing sulphonic acid groups may be prepared from mixtures of two or more ketones with one or more aldehydes, or of one or more ketones with two or more aldehydes. The aldehydes and ketones which may be employed include those specified above, and also others which react to form part of a water-soluble resin of the type specified. The aldehydes and ketones in such mixtures may all be reacted together in stages, or alternatively separate condensates may be mixed together.

The introduction of sulphonic acid groups may be made at any stage in the course of the reaction, both in the case of resins derived from a single aldehyde together with a single ketone, and of those derived from mixtures.

It is an object of this invention to provide novel water-soluble resinous condensation products.

It is a further object of this invention to provide novel water-soluble resinous condensation products containing at least one sulphonic acid group.

It is a still further object of this invention to provide novel water-soluble condensation products of aldehydes and ketones containing at least one sulphonic acid group.

It is a still further object of this invention to provide processes for the manufacture of the aforesaid water-soluble condensation products.

It is yet a further object of this invention to utilise the novel condensation products for the tanning of hides.

The new resins may be prepared by condensing at least one aldehyde with at least one ketone in an alkaline medium to form a resin, followed by treatment with a preferably water-soluble sulphite, bi-sulphite or sulphur dioxide to introduce one or more sulphonic acid groups.

The sulphite or bisulphite need not necessarily have a high solubility in water, provided that the resultant resin may be caused to contain sulphonic acid groups. Thus, for example, an alkaline earth metal sulphite, such as calcium sulphite, may be used.

Alternatively, the initial condensation, introduction of the sulphonic acid groups and resinification may be effected simultaneously by reacting together a preferably water-soluble sulphite or bisulphite, or sulphur dioxide, and one or more aldehydes together with one or more ketones in an alkaline medium.

Alternative to the use of separate sulphites, bi-sulphites, or sulphur dioxide, the sulphonic acid groups may, in whole or in part, be introduced in the form of a bisulphite compound of an aldehyde or ketone (such as formaldehyde bisulphite and acetone bisulphite compounds), or in the form of mixtures of such compounds.

The resins of the present invention are useful as tanning agents and the present invention also includes a process for the manufacture of leather wherein the resins of the present invention are used as tanning agents.

The process of the invention may be effected in various ways. Thus, for example, according to one embodiment a ketol initial condensation product was formed by preparing an acetone-formaldehyde compound as described by White and Haward (J. C. S., 1943, 25) by condensing 4 mols. of acetone with 1 mol. of formaldehyde in the presence of an alkali catalyst and then distilling off excess acetone. From the yield of product it would appear that the acetone actually reacted with the formaldehyde in a ratio approximating to 1 to 1.5 mols. This product was resinified rapidly on warming with alkali to form a highly coloured water-insoluble resin. Sodium sulphite, by virtue of its alkalinity in solution, caused the same resinification to occur. Using concentrated aqueous sodium sulphite solutions as the resinifying agent, rapid exothermic resinification occurred on warming, to form a solid orange-red water-insoluble resin which tended to dissolve on increasing the amount of sodium sulphite. Resinification with cold dilute aqueous sodium sulphite solutions proceeded more slowly but gave a red solution of solubilised resin. During this process the pH rose from 9 to 12. The amount of sodium sulphite required to give a completely soluble product by this technique was determined by maintaining 5 gm. portions of condensation product at room temperature overnight with 5 ml. of water containing various amounts of sulphite. 10 ml. of glacial acetic acid were then added and the mixture diluted to 100 ml. with water. It was found possible to obtain complete water solubility with 2 gms. of sodium sulphite, the product, adjusted to pH=3 with acetic acid, giving a precipitate with gelatin-salt reagent. Lower amounts of sulphite resulted in the formation of some insoluble material.

These sulphite solubilised resins were characterised by certain undesirable properties probably due to the high sulphonic acid group and high acid and salt content. In an attempt to increase the tanning quality and capacity and to produce soluble ketol resins with a lower sulphonic acid content experiments were conducted replacing sodium sulphite by sodium meta-bisulphite followed by alkali. It was found that provided solubilisation was achieved with an amount of sodium meta-bisulphite not exceeding the maximum which would react direct with the ketol initial condensation product (assuming a rise in pH of the reaction mixture to 10.0 to indicate complete reaction), a subsequent pH=11.5 gave a satisfactory controllable rate of resinification and this pH could be obtained by adding only small amounts of alkali. In certain instances a subsequent pH=10.5 gave a satisfactory rate of resinification. This contrasted with the sodium sulphite resins where in the final reaction mixture the pH was above 12.0 due to liberation of a mol. of free sodium hydroxide per mol. of sodium sulphite used.

At pH=11.5 the sodium metabisulphite-alkali resinification rate increased with temperature, but the higher the temperature the more metabisulphite was required to prevent the formation of insoluble material. At room temperature, the minimum proportion by weight of sodium metabisulphite giving a soluble resin after 48 hours at pH=11.5 and giving a product with a satisfactory gelatin precipitation at pH=3 was 10 of the ketol initial condensation product to 0.6 of sodium metabisulphite.

To the following examples, which illustrate the invention, are appended tannin contents as estimated by the official method of the S. L. T. C. In many cases the potential tannin content of the material under test is evidently considerably higher than the figure estimated, an indication of which is given by the increased tannin content quoted in some examples as resulting from increased shake periods or employment of increased amounts of hide powder during the analysis.

1. 150 gms. of the acetone-formaldehyde condensation product obtained by condensing 4 mols. of acetone with 1 mol. of formaldehyde as described by White and Haward (J. C. S., 1943, 25) was reacted with 60 gms. of anhydrous sodium sulphite dissolved in 240 ml. of water and added, with stirring, over 30 minutes. The reaction temperature was maintained below 20° C. at this stage by immersing the reaction flask in an ice bath. The temperature was then raised to 80° C. over 30 minutes, stirring being continued and maintained at that level for 1 hour, a considerable increase of viscosity occurring.

Samples were removed periodically, brought to pH=3 with acetic acid, and tested with gelatin-salt reagent. The amount and appearance of the precipitate improved rapidly initially and then remained constant. The final pH of the reaction mixture was 12.5 and this was adjusted with 300 ml. of glacial acetic acid to pH=3, the mixture being then further diluted with 380 ml. of water. Hide powder analysis of this product indicated a tannin content of 22.4% based on the total solids content (15.6%).

2. A product was prepared as in Example 1 but using 900 gms. of the acetone-formaldehyde condensation product and correspondingly increased amounts of sodium sulphite and water (i. e. 360 gms. and 1260 ml. respectively). In order to reduce the viscosity of this product to a level which would allow it to pass through an ion-exchange column at a reasonable rate at room temperature, a further 1260 ml. of water were added to the final reaction mixture, this mixture having a pH=12.5.

A glass column, 25 cms. long and 3 cms. in diameter, containing 100 gms. of cation exchange Zeokarb 215 was set up and trial runs showed that approximately 100 gms. of the above sulphited resin solution could be satisfactorily decationised per regeneration of this column. The liquid leaving this column flowed over the electrodes of a Muirhead pH meter. The column was first activated with 10% sulphuric acid and then washed with distilled water until the effluent pH was >5. In a typical run, sulphited resin solution was passed through the column at a rate of 200 gms./hour. The effluent pH fell to approximately 0, remained constant until 100 gms. of effluent had been collected, and then commenced to rise slowly. Material of pH<0.1 was collected for use in further tests. This strongly acid solution contained some free $SO_2$ which was removed by heating the solution on a water bath for 30 minutes. 100 gms. of the acid de-ionised resin solution thus obtained was taken, the pH adjusted with 14.5 gms. of 10% (w./v.) aqueous ammonia solution to 2.4, and the product diluted with water to 130 gms. Hide powder analysis indicated this product had a tannin content of 22.7% based on the total solids content (15.4%).

Removal of salts by de-ionisation was expected to result in the resin solution of this example having a correspondingly higher tan content than the resin of Example 1. The fact that no such increase was observed was probably due to the fact that the high acetic acid content of the resin solution of Example 1 (necessary to give an acid pH) raised the apparent tannin content, possibly by buffering the pH during the adsorption stage of the hide powder analysis. Such an action is known to be important in hide powder analysis of syntans although it has little, if any, effect in the analysis of vegetable tannins.

3. White and Haward (J. C. S., 1943, 25) showed that the acetone-formaldehyde condensation product produced from 4 mols. of acetone and 1 mol. of formaldehyde could be fractionated by diluting with dibutyl phthalate and then distilling under reduced pressure, into a number of volatile components and a non-volatile resin which precipitated out from the dibutyl phthalate after removal of the volatile components. 755 gms. of a typical batch of the aforesaid condensation product were, therefore, mixed with 470 gms. of dibutyl phthalate and the mixture fractionated by distillation through a simple column at 12 mm. pressure, giving fraction (i) B. Pt. 30–45° C.—85 gms.; (ii) B. Pt. 90–110° C. mainly, then up to 165° C.—465 gms.; (iii) precipitated from the dibutyl phthalate by cooling, adding 500 ml. of dry ether, filtering, washing with dry ether—125 gms. An overall loss of 80 gms. represents handling losses and losses of undesired highly volatile products down the vacuum line.

60 gms. of sodium sulphite in 240 ml. of water were added during 30 minutes to 150 gms. of the volatile fraction (ii) of the condensation product, the reaction mixture being cooled in an ice bath. The reaction temperature was then increased during 15 minutes to 80° C. and maintained at this temperature for 2 hours, this giving a mixture which produced satisfactory gelatin precipitation at pH=3. It was, therefore, diluted to 600 gms. with water and cooled rapidly to room temperature and used for the preparation of further resins.

100 gms. of this alkaline sulphited resin were de-ionised on the Zeokarb column referred to in Example 2, only effluent material of pH+0.1 being collected. Free $SO_2$ was removed from this product by bubbling nitrogen through the solution and the pH was adjusted to 3 with 10.9 ml. of 10% (w./v.) ammonia solution. The product was then made up to 300 gms. with water. Hide powder analysis indicated a tannin content of 47.5% based on the total solids content (6.3%).

4. A further resin was produced by adding 57 ml. of 10% (w./v.) sulphuric acid to 150 gms. of the alkaline sulphited product obtained in Example 3 before de-ionisation to give a pH=3.12. Hide powder analysis indicated the tannin content of the product to be 35.3% based on the total solids content (23.8%).

5. A further resin was similarly produced by adding 75 ml. of glacial acetic acid to 150 gms. of alkaline sulphited product obtained in Example 3 before de-ionisation to give a pH=3.55. This product was found by hide powder analysis to contain 42.3% tannins based on the total solids content (22.7%).

6. 50 gms. of the resinous non-volatile fraction (iii) referred to in Example 3 were dissolved in 50 gms. of ethyl alcohol at room temperature and 20 gms. of sodium sulphite in 80 gms. of water added with stirring over 30 minutes. At the end of this period the reaction temperature had risen to 45° C. and it remained spontaneously at that level for 30 minutes before falling again. The solution was then allowed to cool to room temperature.

7. 80 ml. of the solution obtained in Example 6 was de-ionised as described in Example 2, the solution being further diluted during this procedure. No free $SO_2$ was observed in this preparation and the pH was therefore adjusted to 2.92 by adding 10.5 ml. (w./v.) of 10% aqueous ammonia solution, giving a total of 176.5 gms. of product. Hide powder analysis indicated the tannin content of this product to be 39.5% based on the total solids (11.4%).

8. A resin solution was formed by adding 26.5 ml. of 10% (w./v.) sulphuric acid to 75 gms. of the solution obtained in Example 6 and diluting to 169 gms. with water. Hide powder analysis showed that this product had a tannin analysis of 30.6% based on the total solids content (14.7%).

9. To 600 gms. of the acetone-formaldehyde condensation product obtained by condensing 4 mols. of acetone with 1 mol. of formaldehyde as described by White and Haward (J. C. S., 1943, 25) were added 42 gms. of sodium metabisulphite dissolved in 600 gms. of water, and 12 ml. of 20% (w./v.) sodium hydroxide solution. The reaction product was diluted with water to 1460 gms. A resin solution was prepared by adding 3.5 ml. of 10% (w./v.) sulphuric acid to 100 gms. of this product and diluting to 200 gms. with water, giving a pH=2.3. Hide powder analysis indicated a tannin content of 52.25% based on the total solids content (15.1%). At 7.88% tannin content a solution of this resin had the low acid and salt content figures of 20 and 185 mgm. equivalents per litre respectively, and compared favourably with the best vegetable tannins.

10. Into 400 gms. of the acetone-formaldehyde condensation product obtained by condensing 4 mols. of acetone with 1 mol. of formaldehyde as described by White and Haward (J. C. S., 1943, 25) were run, with stirring, over 20 minutes, 60 gms. of sodium metabisulphite in 400 gms. of water. After a further 10 minutes, 8 ml. of 20% (w./v.) sodium hydroxide were added, and the mixture allowed to stand. During the first hour the temperature tended to rise, and was kept below 50° C. by slight cooling. After 24 hours slight gelatin-precipitating powers had developed. The temperature was then raised to 70° C. and held for 2½ hours. Excess alkali was neutralised with 4.4 ml. of 50% (w./v.) sulphuric acid, and the whole diluted with water to 1000 gms. 25 gms. of this product were acidified with 0.65 ml. of 10% (w./v.) sulphuric acid, and diluted to 1 litre for analysis. Hide-powder analyses after 10 minute and 60 minute shake periods employing a normal hide-powder, and after a 10 minute period employing double the normal quantity of hide-powder, gave respectively 55%, 61% and 67% tannin content based on the total solids content (8.21 gms. per litre).

11. Into 400 gms. of the acetone-formaldehyde condensation product obtained by condensing 4 mols. of acetone with 1 mol. of formaldehyde as described by White and Haward (J. C. S., 1943, 25) were run, with stirring, over 30 minutes, 108 gms. of sodium metabisulphite in 400 gms. of water, the temperature being maintained at 70° C. during the final stages in order to facilitate the reaction. The temperature was maintained for a further 30 minutes, and the product allowed to cool. 8 ml. of 20% (w./v.) sodium hydroxide were added, and the temperature rose to 40° C. and the mixture was allowed to stand. After 24 hours, slight gelatin-precipitating powers had developed. The temperature was then raised to 80° C. and held for 3½ hours. Excess alkali was neutralised with 2.8 ml. of 50% (w./v.) sulphuric acid, and the whole diluted with water to 1000 gms. 25 gms. of this product were acidified with 0.65 ml. of 10% (w./v.) sulphuric acid, and diluted to 1 litre for analysis. Hide-powder analyses after 10 minute and 60 minute shake periods employing a normal hide-powder, and after a 10 minute period employing double the normal quantity of hide-powder, gave respectively 41%, 50% and 59% tannin content based on the total solids content (9.31 gms. per litre).

12. 400 gms. of the acetone-formaldehyde condensation product obtained by condensing 4 mols. of acetone with 1 mol. of formaldehyde as described by White and Haward (J. C. S., 1943, 25) were distilled at 12 mm. pressure in the presence of 300 gms. of dibutyl phthalate up to a distillation temperature of 180° C. The non-volatiles were isolated as described in Example 3. The yield was 48 gms. 10 gms. of this product were dissolved in 10 gms. of ethyl alcohol and the solution refluxed for 3 hours with 2 gms. of sodium metabisulphite in 10 ml. of water. The mixture was left overnight and the pH then brought to 11.5 by adding 2 ml. of 20% (w./v.) sodium hydroxide solution. Refluxing was then continued for 30 minutes. On acidifying with 10% sulphuric acid solution, the resultant resin was completely soluble and gave a pale cream coloured precipitate with gelatin reagent at pH=3. This product was used for a tanning trial and gave a particularly good leather.

A number of solubilised resins according to the invention were now prepared from condensation products formed from acetone and formaldehyde employed in various ratios.

A commercial 37% aqueous formaldehyde solution was used to produce these products because of its lower cost and greater suitability for commercial operation. Acetone-formaldehyde molecular ratios from 1 to 2 to 1 to 6 were employed. In all cases the initial reaction was spontaneous and increasingly rapid and exothermic at pH values greater than 10.5. Temperatures maintained at or below 50° C. favoured the formation of colourless condensation products. The tendency to form coloured and finally insoluble products at increasing temperatures or under prolonged or increasingly alkaline conditions became less as the acetone-formaldehyde ratio decreased from 1 to 2 to 1 to 6.

Several condensations were carried out using a molecular ratio of acetone to formaldehyde of 1 to 2 at various degrees of alkalinity. Using magnesium oxide as the alkaline catalyst (pH 8.5 to 9) the condensation was incomplete and free formaldehyde was present even after several hours' refluxing. Sodium carbonate as catalyst (pH 10.5 to 10.7) gave a colourless, completely condensed product at 50° C. If this condensate was refluxed for 10 minutes with excess sodium carbonate some 50% of the organic content was converted to a pale yellow water-insoluble solid resin; for example, 243 gms. of 37% formaldehyde solution (3 mols.) were warmed gently with 87 gms. (1.5 mols.) of acetone and 40 ml. of 10% (w./v.) sodium carbonate solution. The temperature rose to 80° C. spontaneously and remained at 75° C. for 15 minutes without external heating. The final pH was 10.2. 50 gms. of this product were refluxed for 10 minutes with 5 ml. of 10% (w./v.) sodium carbonate solution, resulting in the precipitation of 12 gms. of pale yellow resin.

This latter resin was soluble in ethyl alcohol and in this condition could be solubilised by sodium metabisulphite, the solution giving a fair, almost white gelatin precipitate at pH=3. Further condensation of the bisulphited resin with alkali increased the capacity for precipitating gelatin.

Sodium hydroxide as catalyst gave a pH=11 to 12.5, the amounts of alkali needed to produce a pH slightly under 11 being very small and also being used up rapidly during the reaction, as much as 1/80 of a ml. of sodium hydroxide being neutralised during the reaction per mol. of formaldehyde present (Cannizzaro reaction). The reaction was rapid and more difficult to control than with sodium carbonate as catalyst, but with care a colourless product could be obtained by condensing at 50° C. or below. Using slightly excessive amounts of alkali resulted in the formation of insoluble orange-coloured resins.

Qualitative tests indicated that trisodium orthophosphate, giving a pH=11 to 11.5 was likely to be a useful catalyst for the condensation.

A series of small scale experiments including the above findings also showed that gelatin-precipitating sulphited and metabisulphited-alkali resins could be readily prepared. The amount of metabisulphite reacting directly was apparently less than in the case of the reaction using 4 mols. of acetone and 1 mol. of formaldehyde.

13. An initial condensation product was prepared by reacting 243 gms. of 37% formaldehyde solution (3 gm.-mols.) with 87 gms. of acetone (1.5 gm.-mols.) in the presence of 7.5 ml. of 20% (w./v.) sodium hydroxide solution. The temperature was maintained at 50° C. for 10 minutes and the reaction mixture then allowed to cool for 30 minutes after which time excess alkali was neutralised with 8 ml. of 10% (w./v.) sulphuric acid solution.

116 gms. of this product was reacted with 10 gms. of sodium sulphite, the temperature rising spontaneously to 70° C. at which it was maintained for 15 minutes, a marked increase in viscosity occurring. A little water was added and the mixture kept at 80° C. for a further 15 minutes, then brought to pH=2.5 with 40 ml. of 10% (w./v.) sulphuric acid solution, and made up with water to 303 gms. Hide powder analysis showed a tannin content of 22.2% based on the total solids content (17.1%).

14. 116 gms. of the initial condensation product of Example 13 was stirred for 10 minutes with 4 gms. of sodium metabisulphite. 2 ml. of 20% (w./v.) sodium hydroxide solution were then added to give a pH=11.5. The temperature was then raised gradually to 50° C. and maintained there for 2 hours, the pH then being adjusted to 2.6 with 7 ml. of 10% (w./v.) sulphuric acid solution, giving a total weight of 130 gms. Hide powder analysis indicated a tannin content of 42.9% based on the total solids content (34.1%).

15. A solid water-insoluble resin was prepared as already described by refluxing a 2:1 molar condensate of aqueous formaldehyde and acetone with aqueous sodium carbonate. 100 gms. of this resin were shaken and warmed slightly with 75 gms. of ethyl alcohol and 50 gms. of water until dissolved. 15 gms. of sodium metabisulphite were then added, and the mixture warmed slowly up to refluxing temperature over 45 minutes, and refluxed for a further 5 minutes. A distinct colour change from yellow to deep orange indicated a rise in pH at the apparent completion of the reaction with metabisulphite (final pH=10). The solution was neutralised immediately by the addition of 1.4 ml. of 10% (w./v.) sulphuric acid. 25 gms. of the neutralised material were acidified with 1 ml. of 10% (w./v.) sulphuric acid, and diluted to 100 gms. with water. Hide powder analysis indicated a tannin content of 48% based on the total solids content (10.3%).

16. Into 232 gms. of acetone (4 gm.-mols.) and 10 gms. of sodium carbonate were run, with stirring, over 30 minutes, 648 gms. of 37% formaldehyde solution (8 gm.-mols.). The temperature rose to 80° C. After a further 30 minutes at 70–75° C. a further 10 gms. of sodium carbonate were added, and the temperature maintained at 70–75° C. for another hour. To the mixture of solid resin and solution were added 300 gms. of ethyl alcohol. The mixture was stirred, and 75 gms. of sodium metabisulphite added over 30 minutes, followed by 10 ml. of 20% (w./v.) sodium hydroxide. The pH rose to 11.5. The temperature was maintained at 70–75° C. and after 4 hours the mixture was completely soluble. 275 gms. of volatiles (mainly ethyl alcohol) were removed by distillation under slightly reduced pressure during the final hour. Excess alkali was neutralised with 70 ml. of 10% (w./v.) sulphuric acid, giving a total of 1060 gms. 60 gms. of this neutralised product were acidified with 3.5 ml. of 10% (w./v.) sulphuric acid, and diluted to 225 gms. with water. Hide powder analysis indicated a tannin content of 43.8% based on the total solids content (10.2%).

17. 116 gms. of acetone (2 gm.-mols.) were stirred with 243 gms. of 37% formaldehyde solution (3 gm.-mols.) and 2 gms. of sodium carbonate. The temperature was maintained at 35–40° C. for 4 hours, some cooling being necessary at first, and slight warming during the final stages. 19 gms. of sodium metabisulphite (one-fifth gm.-mol.) in 25 gms. of water were added to 16 gms. of 37% formaldehyde solution (one-fifth gm.-mol.). The bisulphite compound was then run rapidly into the acetone-formaldehyde condensate. 4 ml. of 20% (w./v.) sodium hydroxide were added raising the pH from 10.5 to 11.5. The temperature was maintained at 50° C. for 1½ hours. The mixture was allowed to stand overnight, and heating then continued at 60–70° C. for 3 hours, the pH being maintained at 11.5 by the addition of a further 2 ml. of 20% (w./v.) sodium hydroxide. Excess alkali was then neutralised with 25 ml. of 10% (w./v.) sulphuric acid, giving a total weight of 454 gms. 50.5 gms. of this neutralised product were acidified with 2.5 ml. of 10% (w./v.) sulphuric acid, and diluted to 200 gms. with water. Hide powder analysis indicated a tannin content of 53.5% based on the total solids content (9.04%).

18. Into 324 gms. of 37% formaldehyde solution (4 gm.-mols) were run, with stirring, over 45 minutes, 116 gms. of acetone (2 gm.-mols.) together with 20 ml. of 2 N potassium hydroxide in methyl alcohol. The temperature was controlled by the rate of addition to remain in the range 50–60° C. 25 gms. of sodium metabisulphite were added, with stirring, to 81 gms. of 37% formaldehyde solution (1 gm.-mol.) and the mixture run rapidly into the acetone-formaldehyde condensate. The temperature was maintained at 50–60° C. for 2 hours, the pH being maintained at 11.5 by the gradual addition of 20 ml. of 20% (w./v.) sodium hydroxide. Excess alkali was neutralised with 40 ml. of 10% (w./v.) sulphuric acid, giving a total of 630 gms. 31.5 gms. of this neutralised product were acidified with 3.5 ml. of 10% (w./v.) sulphuric acid, and diluted with water to 1 litre. Hide powder analyses after 10 minute and 24 hour shake periods gave respectively 42.5% and 47.0% tannin content based on the total solids content (10.96 gms. per litre).

19. Into 116 gms. of acetone (2 gm.-mols.) were run, with stirring, 25 gms. of sodium metabisulphite in 50 gms. of water. 5 ml. of 20% sodium hydroxide were added, and 495 gms. of 37% formaldehyde solution (5 gm.-mols.) run in, with stirring, during 30 minutes. The temperature was maintained in the range 50–60° C. The temperature was maintained for a further 30 minutes, the pH being maintained at 11.5 by the gradual addition of 5 ml. of 20% (w./v.) sodium hydroxide. The temperature was raised to 70° C. for a further hour, the pH being maintained at 11.5 by the further addition of 8 ml. of 20% (w./v.) sodium hydroxide. Excess alkali was neutralised with 20 ml. of 10% (w./v.) sulphuric acid. 29.5 gms. of this neutralised product were acidified with 2.1 ml. of 10% (w./v.) sulphuric acid, and diluted with water to 1 litre. Hide powder analyses after 10 minute and 24 hour shake periods gave respectively 45.2% and 54.5% tannin content based on the total solids content (10.29 gms. per litre).

20. To 405 gms. of 37% formaldehyde solution (5 gm.-mols.) were added, with stirring, 25 gms. of sodium metabisulphite. 10 gms. of sodium carbonate were added, and 116 gms. of acetone (2 gm.-mols.) run in, with stirring, during 1 hour, the temperature being controlled at 40–50° C. The temperature was then raised during 1 hour to 90° C. and maintained for 3 hours, the pH being maintained at 10.5 by the gradual addition of 5 ml. of 20% (w./v.) sodium hydroxide. Excess alkali was neutralised with 40 ml. of 10% (w./v.) sulphuric acid, and the whole diluted with water to 700 gms. 38 gms. of this neutralised product were acidified with 2.8 ml. of 10% (w./v.) sulphuric acid, and diluted with water to 1 litre. Hide powder analyses after 10 minute and 24 hour shake periods gave the same figure of 46.0% tannin content based on the total solids content (11.73 gms. per litre).

21. Into 116 gms. of acetone (2 gm.-mols.) together with 5 gms. of sodium carbonate were run, with stirring, during 1 hour, 405 gms. of 37% formaldehyde solution (5 gm.-mols.), the temperature being controlled at 45–50° C. The temperature was then raised to 70° C. for 30 minutes, the pH being maintained at 10.5 by the addition of 2 ml. of 20% (w./v.) sodium hydroxide. Unreacted acetone was distilled off during the final 15 minutes, amounting to 20 gms. of an aqueous mixture (approximately 75% acetone). 25 gms. of sodium metabisulphite in 50 gms. of water were run in during 10 minutes, and the temperature maintained at 75–85° C. for 3½ hours, the pH being maintained in the range 10–10.5 by the gradual addition of 10 ml. of 20% (w./v.) sodium hydroxide. Excess alkali was neutralised with 12 ml. of 10% (w./v.) sulphuric acid, giving a total of 603 gms. 60.3 gms. of this neutralised product were acidified with 9 ml. of 10% (w./v.) sulphuric acid, and diluted with water to 225 gms. Hide powder analyses after 10 minute and 60 minute shake periods gave respectively 43.5% and 48.5% tannin content based on the total solids content (9.9%).

22. 324 gms. of 37% formaldehyde solution (4 gm.-mols.), 58 gms. of acetone (1 gm.-mol.) and 25 ml. of 20% (w./v.) sodium hydroxide solution were maintained at 50° C. for 1 hour, the pH then being 10.5. The mixture was then allowed to cool over 1 hour, the pH falling to 9.5. Yield=411 gms. This condensate had virtually no reaction with sodium metabisulphite at room temperature but gave a soluble resin on warming with sodium sulphite as follows:

103 gms. of the above condensate were warmed with 9 gms. of sodium sulphite, the temperature rising to and being maintained at 70° C. for 1 hour. The reaction mixture was then acidified to pH=3.4 with 35 ml. of 10% (w./v.) sulphuric acid solution yielding 149 gms. of product. Hide powder analysis indicated a tannin content of 25.6% based on the total solids content (32.1%).

23. Into 324 gms. of 37% formaldehyde solution (4 gm.-mols.) together with 25 ml. of 20% (w./v.) sodium hydroxide was run, with stirring, over 1 hour, 58 gms. of acetone (1 gm.-mol.), the temperature being kept below 50° C. with some cooling. The pH was maintained at 10.5–11 during the following 4 hours by the gradual addition of 15 ml. of 20% (w./v.) sodium hydroxide, the temperature being maintained at 60–70° C. At this stage precipitation of a yellow water-insoluble resin commenced, and 80 gms. of ethyl alcohol were added in order to solubilise the resin. 16 gms. of sodium metabisulphite were then added gradually over 1 hour, the temperature being maintained at 70–75° C. The final pH was 10.5. After leaving at room temperature overnight, heating was continued for 6 hours at 75–80° C., the pH being maintained at 11–11.5 by gradual addition of 10 ml. of 20% (w./v.) sodium hydroxide. Excess alkali was neutralised with 2.5 ml. of 10% (w./v.) sulphuric acid, and aqueous alcohol removed by distillation under slightly reduced pressure (95 gms.), leaving 405 gms. of resin solution. 25 gms. of this neutralised product were acidified with 8 ml. of 10% (w./v.) sulphuric acid, and diluted with water to 1 litre. Hide powder analyses after 10 minute and 24 hour shake periods gave respectively 40.1% and 46.8% tannin content based on the total solids content (10.83 gms. per litre).

24. 50 gms. of a condensation product prepared by the reaction of 3 mols, of methyl ethyl ketone with 1 mol. of paraformaldehyde as described in United Kingdom specification No. 551,219 were warmed for 10 minutes with 10 gms. of sodium metabisulphite in 47 gms. of water and 17 ml. of 20% (w./v.) sodium hydroxide solution then added, bringing the pH to 11.5. The temperature was then raised to 40° C. for 1 hour, then to 80° C. for 1 hour, and the pH then adjusted to 3.11 with 43 ml. of 10% (w./v.) sulphuric acid solution and 3 ml. of 10% (w./v.) sodium hydroxide solution, giving a yield of 176 gms. of product. Tannin analysis by the hide powder method showed a tannin content of 34.9% based on the total solids content (28.7%).

25. 10 gms. of the condensation product used as initial material in Example 24 were maintained at 50° C. for 2 hours with 2 gms. of sodium sulphite in 15 ml. of water. The reaction product was left overnight and then adjusted to pH=2.4 with 8 ml. of 10% (w./v.) sulphuric acid solution. The whole was diluted to 50 gms. with water. Hide powder analysis indicated a tannin content of 38.6% based on the total solids content (18.4%).

Qualitative small scale tests again indicated that pale resins can be produced by carrying out the alkali-catalysed condensation of the suphited reaction mixture in the presence of an initial amount of free formaldehyde, a feature which had already been observed for the acetone-formaldehyde products.

26. 44 gms. of acetaldehyde together with 70 gms. of crotonaldehyde were added, with stirring, during 30 minutes, to 464 gms. of acetone and 20 ml. of 2 N methyl alcoholic KOH kept below 5° C. in an ice bath. After 15 minutes' further stirring the reaction mixture was neutralised by passing in $CO_2$, then filtered and the excess acetone distilled off, leaving 178 gms. of condensation product.

Into 89 gms. of this condensate, together with 40 gms. of ethyl alcohol, were run rapidly, with stirring, 20 gms. of sodium metabisulphite in 80 gms. of water. After warming for 15 minutes at 50° C. the mixture was allowed to cool, and 5 ml. of 20% (w./v.) sodium hydroxide added, bringing the pH to 11.5. After standing overnight at room temperature, the mixture was heated for 6 hours at 80° C., the pH being maintained by the addition of a further 5 ml. of 20% (w./v.) sodium hydroxide. Excess alkali was neutralised with 17 ml. of 10% (w./v.) sulphuric acid, giving a total of 178 gms. of this neutralised product were acidified with 1.3 ml. of 10% (w./v.) sulphuric acid, and diluted with water to 1 litre. Hide powder analyses after 10 minute and 60 minute shake periods gave respectively 46.3% and 48.3% tannin content based on the total solids content (4.07 gms. per litre).

27. 70 gms. of crotonaldehyde together with 162 gms. of 37% aqueous formaldehyde were added, with stirring, during 30 minutes to 116 gms. of acetone and 2 gms. of $Na_2CO_3$ cooled in an ice bath to below 10° C. Towards the end of this period the pH was maintained at 10.5–11 by the gradual addition of 5 ml. of 20% NaOH. The temperature was then raised during 15 minutes to 35° C. and maintained at 35–40° C. with some cooling for half an hour. After standing overnight, the mixture was warmed at 40° C. for 3 hours, the pH being maintained at 10.5–11 by the gradual adddition of 3 ml. of 20% NaOH. The mixture was neutralised with 5 ml. of 10% $H_2SO_4$ and filtered, yielding 360 gms. of an aqueous solution of condensation product.

Into 180 gms. of this condensate were run rapidly, with stirring, 20 gms. of sodium metabisulphite in 90 gms. of water, and after warming for 15 minutes at 50° C., the mixture was allowed to cool, and 10 ml. of 20% (w./v.) sodium hydroxide added, bringing the pH to 11.5. After standing overnight at room temperature, the mixture was heated for 3 hours at 80° C. Excess alkali was neutralised with 10 ml. of 10% (w./v.) sulphuric acid, giving a total of 312 gms. 15 gms. of this neutralised product were acidified with 2.2 ml. of 10% (w./v.) sulphuric acid, and diluted with water to 1 litre. Hide powder analyses after 10 minute and 60 minute shake periods gave respectively 39.5% and 39.8% tannin content based on the total solids content (4.88 gms. per litre).

28. 44 gms. of acetaldehyde together with 162 gms. of 37% aqueous formaldehyde were added, with stirring, during 30 minutes, to 58 gms. of acetone together with 72 gms. of methyl ethyl ketone and 2 gms. of $Na_2CO_3$ kept below 10° C. in an ice bath. Towards the end of this period the pH was maintained at 10.5–11 by the gradual addition of 5 ml. of 20% NaOH. The temperature was then raised during 15 minutes to 35° C., and maintained at about 40° C. for a further 1½ hours, the pH being maintained by the gradual addition of a further 3 ml. of 20% NaOH. The mixture was then neutralised with 6 ml. of 10% $H_2SO_4$, yielding 354 gms. of an aqueous solution of condensation product.

Into 117 gms. of this condensate, together with 40 gms. of ethyl alcohol, were run rapidly, with stirring, 20 gms. of sodium metabisulphite in 100 gms. of water. After warming for 15 minutes at 50° C. the mixture was allowed to cool, and 10 ml. of 20% (w./v.) sodium hydroxide, added, bringing the pH to 11.5. After standing overnight at room temperature the mixtture was heated for 6 hours at 80° C., the pH being maintained by the further addition of 5 ml. of 20% (w./v.) sodium hydroxide, while a further total of 20 gms. of ethyl alcohol was added to maintain complete solubility. Excess alkali was neutralised with 25 ml. of 10% (w./v.) sulphuric acid, giving a total of 490 gms. 20 gms. of this neutralised product were acidified with 2.7 ml. of 10% (w./v.) sulphuric acid, and diluted with water to 1 litre. Hide powder analyses after 10 minute and 60 minute shake periods gave respectively 26.2% and 26.2% of tannin content based on the total solids content (4.50 gms. per litre).

29. 22 gms. of acetaldehyde together with 35 gms. of crotonaldehyde and 162 gms. of 37% aqueous formaldehyde were added, with stirring, during 30 minutes to 58 gms. of acetone together with 72 gms. of methyl ethyl ketone and 2 gms. of $Na_2CO_3$ kept below 10° C. in an ice bath. Towards the end of this period the pH was maintained at 10.5–11 by the gradual addition of 5 ml. of 20% NaOH. The temperature was then raised during 15 minutes to 35° C. and maintained at 35–40° C. with some cooling for 1 hour, the pH being maintained by the gradual addition of a further 5 ml. of 20% NaOH. The mixture was allowed to stand overnight, and then neutralised with 5 ml. of 10% $H_2SO_4$, yielding 367 gms. of an aqueous solution of condensation product.

Into 92 gms. of this condensate were run rapidly, with stirring, 10 gms. of sodium metabisulphite in 25 gms. of water. After warming for 30 minutes at 50° C. the mixture was allowed to cool, and 2.5 ml. of 20% (w./v.) sodium hydroxide added together with 10 gms. of water, bringing the pH to 11.5. The mixture was warmed at 70–75° C. for a total of 4½ hours, the pH being maintained by the addition of a further 3.75 ml. of 20% (w./v.) sodium hydroxide, while a total of 20 gms. of ethyl alcohol was added to maintain complete solubility. After standing at room temperature overnight, heating was continued for a further 4 hours at 80° C., the pH being maintained by the addition of a further 1.25 ml. of 20% (w./v.) sodium hydroxide. Excess alkali was neutralised with 10 ml. of 10% (w./v.) sulphuric acid, giving a total of 175 gms. 20 gms. of this neutralised product were acidified with 2.8 ml. of 10% (w./v.) sulphuric acid, and diluted with water to 1 litre. Hide powder analyses after 10 minute and 60 minute shake periods gave respectively 35.9% and 35.4% tannin content based on the total solids content (5.61 gms. per litre).

30. 243 gms. of 37% aqueous formaldehyde were added, with stirring, during 30 minutes to 58 gms. of acetone, together with 72 gms. of methyl ethyl ketone and 2 gms. of $Na_2CO_3$, the temperature being maintained at 35–40° C. for 3 hours. The mixture was left overnight, and then maintained for a further 5 hours at about 40° C., the pH being maintained at 10.5–11 by the gradual addition of 3 ml. of 20% NaOH. The mixture was neutralised with 6 ml. of 10% $H_2SO_4$, yielding 380 gms. of an aqueous solution of condensation product.

Into 190 gms. of this condensate were run rapidly, with stirring, 20 gms. of sodium metabisulphite in 50 gms. of water. After warming for 15 minutes at 50° C., the mixture was allowed to cool, and 20 ml. of 20% (w./v.) sodium hydroxide added, bringing the pH to 11.5. 40 gms. of ethyl alcohol were added in order to maintain complete solubility, and the mixture allowed to stand at room temperature overnight. The mixture was then heated for 3 hours at 80° C. Excess alkali was neutralised with 60 ml. of 10% (w./v.) sulphuric acid, giving a total of 386 gms. 20 gms. of this neutralised product were acidified with 1.4 ml. of 10% (w./v.) sulphuric acid, and diluted with water to 1 litre. Hide powder analyses after 10 minute and 60 minute shake periods gave respectively 35.9% and 42.3% tannin content based on the total solids content (4.21 gms. per litre).

31. To 80 gms. of the acetone-formaldehyde condensation product obtained by condensing 4 mls. of acetone with 1 ml. of formaldehyde as described by White and Haward (J. C. S., 1943, 25) were added 20 gms. of calcium sulphite and 120 gms. of water, and the mixture agitated at room temperature. During the first hour the pH rose gradually from 7 to 12, indicating reaction of the sulphite with liberation of calcium hydroxide. After a total of 24 hours' agitation at room temperature, the temperature was raised to 50° C. for 3 hours, and then to 90° C. for a further 1 hour. When cool, a quantity of solid matter was filtered off and washed with water, the washings being added to the filtrate, making a total of 480 gms. of aqueous solution. The solution was acidified with 11 ml. of 10% (w./v.) sulphuric acid, filtered from a small amount of precipitated matter, and made up to 500 gms. with water. Hide powder analysis indicated a tannin content of 48.4% based on the total solids content (4.42%).

The products of Examples 1 and 3 had an appreciable tanning action at pH 3, producing thin dark leathers which were, however, fairly flexible and lighter in colour when worked. The shrinkage temperature of these leathers was 58° C.

The product of Example 9 gave better results. A five day treatment of split hide at pH=3 and at a 5% tan concentration gave a fairly full, rather stiff, harsh leather with a brittle grain and a shrinkage temperature of 67° C.

A stiff but full leather of shrinkage temperature=67° C. was produced by tanning over 7 days at pH values falling progressively from 5 to 3.5 and tan concentrations increasing from 0.25% to 3.0%.

A flexible full leather of shrinkage temperature=66° C. was produced by tanning over 20 days at pH values falling from 5 to 4, and tan concentrations increasing from 0.25 to 6.0%. Analysis of this leather gave a degree of tannage figure of 47.4.

The product of Example 12 was used to tan split hide for 4 days at pH=4. It gave a soft, supple, full, light cream coloured leather with a strong fibre and shrinkage temperature=65° C.

The product of Example 15 was used to tan split hide over 10 days, the pH falling from 5 to 3.3, and the solids concentration rising from 1% to 10%. The leather was rather stiff, full and pale cream in colour, and had a shrinkage temperature=66° C. Analysis of this leather gave a degree of tannage figure=59.5.

What we claim is:

1. Water-soluble resinous condensation products of at least one aldehyde of the formula RCHO, wherein R is selected from the group consisting of hydrogen and saturated and unsaturated aliphatic hydrocarbon groups containing from one to three carbon atoms and at least one ketone of the formula R'R"CO, wherein each of the substituents R' and R" is an alkyl group wherein R' plus R" is not more than four carbon atoms, containing at least one sulphonic acid group.

2. Water-soluble resinous condensation products of formaldehyde and at least one ketone of the formula R'R"CO, wherein each of the substituents R' and R" is an alkyl group wherein R' plus R" is not more than four carbon atoms, containing at least one sulphonic acid group.

3. Water-soluble resinous condensation products of acetaldehyde and at least one ketone of the formula R'R"CO, wherein each of the substituents R' and R" is an alkyl group wherein R' plus R" is not more than four carbon atoms, containing at least one sulphonic acid group.

4. Water-soluble resinous condensation products of crotonaldehyde and at least one ketone of the formula R'R"CO, wherein each of the substituents R' and R" is an alkyl group wherein R' plus R" is not more than four carbon atoms, containing at least one sulphonic acid group.

5. Water-soluble resinous condensation products of at least one aldehyde of the formula RCHO, wherein R is selected from the group consisting of hydrogen and saturated and unsaturated aliphatic hydrocarbon groups containing from one to three carbon atoms and acetone containing at least one sulphonic acid group.

6. Water-soluble resinous condensation products of at least one aldehyde of the formula RCHO, wherein R is selected from the group consisting of hydrogen and saturated and unsaturated aliphatic hydrocarbon groups containing from one to three carbon atoms and methyl ethyl ketone containing at least one sulphonic acid group.

7. Water-soluble resinous condensation products of at least one aldehyde of the formula RCHO, wherein R is selected from the group consisting of hydrogen and saturated and unsaturated aliphatic hydrocarbon groups containing from one to three carbon atoms and methyl propyl ketone containing at least one sulphonic acid group.

8. A process for the manufacture of water-soluble resinous condensation products which comprises condensing at least one aldehyde of the formula RCHO, wherein R is selected from the group consisting of hydrogen and saturated and unsaturated aliphatic hydrocarbon groups containing from one to three carbon atoms with at least one ketone of the formula R'R"CO, wherein each of the substituents R' and R" is an alkyl group wherein R' plus R" is not more than four carbon atoms, in an alkaline medium in the presence of a reagent which introduces at least one sulphonic acid group into the condensation product.

9. A process for the manufacture of water-soluble resinous condensation products which comprises condensing at least one aldehyde of the formula RCHO, wherein R is selected from the group consisting of hydrogen and saturated and unsaturated aliphatic hydrocarbon groups containing from one to three carbon atoms with at least one ketone of the formula R'R" CO, wherein each of the substituents R' and R" is an alkyl group wherein R' plus R" is not more than four carbon atoms, in an alkaline medium and treating the condensation product with a reagent which introduces at least one sulphonic acid group into the condensation product.

10. A process for the manufacture of water-soluble resinous condensation products which comprises condensing at least one aldehyde of the formula RCHO, wherein R is selected from the group consisting of hydrogen and saturated and unsaturated aliphatic hydrocarbon groups containing from one to three carbon atoms with at least one ketone of the formula R'R"CO, wherein each of the substituents R' and R" is an alkyl group wherein R' plus R" is not more than four carbon atoms, in an alkaline medium to form a resin and thereafter treating the resin with a sulphite.

11. A process for the manufacture of water-soluble resinous condensation products which comprises condensing at least one aldehyde of the formula RCHO, wherein R is selected from the group consisting of hydrogen and saturated and unsaturated aliphatic hydrocarbon groups containing from one to three carbon atoms with at least one ketone of the formula R'R"CO, wherein each of the substituents R' and R" is an alkyl group wherein R' plus R" is not more than four carbon atoms, in an alkaline medium to form a resin and thereafter treating the resin with a bisulphite.

12. A process for the manufacture of water-soluble resinous condensation products which comprises condensing at least one aldehyde of the formula RCHO, wherein R is selected from the group consisting of hydrogen and saturated and unsaturated aliphatic hydrocarbon groups containing from one to three carbon atoms with at least one ketone of the formula R'R"CO, wherein each of the substituents R' and R" is an alkyl group wherein R' plus R" is not more than four carbon atoms, in an alkaline medium to form a resin and thereafter treating the resin with sulphur dioxide.

13. A process for the manufacture of water-soluble resinous condensation products which comprises condensing at least one aldehyde of the formula RCHO, wherein R is selected from the group consisting of hydrogen and saturated and unsaturated aliphatic hydrocarbon groups containing from one to three carbon atoms with at least one ketone of the formula R'R"CO, wherein each of the substituents R' and R" is an alkyl group wherein R' plus R" is not more than four carbon atoms, in an alkaline medium to form a resin and thereafter treating the resin with a water-soluble sulphite.

14. A process for the manufacture of water-soluble resinous condensation products which comprises condensing at least one aldehyde of the formula RCHO, wherein R is selected from the group consisting of hydrogen and saturated and unsaturated aliphatic hydrocarbon groups containing from one to three carbon atoms with at least one ketone of the formula R'R"CO, wherein each of the substituents R' and R" is an alkyl group wherein R' plus R" is not more than four carbon atoms, in an alkaline medium to form a resin and thereafter treating the resin with a water-soluble bisulphite.

15. A process for the manufacture of water-soluble resinous condensation products which comprises condensing at least one aldehyde-bisulphite compound with at least one ketone of the formula R'R"CO, wherein each of the substituents R' and R" is an alkyl group wherein R' plus R'' is not more than four carbon atoms, in an alkaline medium.

16. Water-soluble resinous condensation products of formaldehyde and acetone containing at least one sulphonic acid group.

17. A process for the manufacture of water-soluble resinous condensation products which comprises condensing at least one aldehyde of the formula RCHO, wherein R is selected from the group consisting of hydrogen and saturated and unsaturated aliphatic hydrocarbon groups containing from one to four carbon atoms with at least one ketone of the formula R'R''CO, wherein each of the substituents R' and R'' is an alkyl group wherein R' plus R'' is not more than four carbon atoms, in an alkaline medium to form a resin and thereafter treating the resin with sodium meta-bisulphite.

References Cited in the file of this patent

UNITED STATES PATENTS

| Number | Name | Date |
|---|---|---|
| 1,203,069 | Striasny et al. | Oct. 31, 1916 |
| 1,722,904 | Somerville | July 30, 1929 |
| 2,009,255 | Friestedt | July 23, 1935 |
| 2,237,325 | Balz | Apr. 8, 1941 |
| 2,308,841 | Werntz | Jan. 19, 1943 |
| 2,387,619 | Seidel et al. | Oct. 23, 1945 |
| 2,455,282 | Thurston | Nov. 30, 1948 |

FOREIGN PATENTS

| Number | Country | Date |
|---|---|---|
| 802,840 | France | June 22, 1936 |